United States Patent Office 3,487,492
Patented Jan. 6, 1970

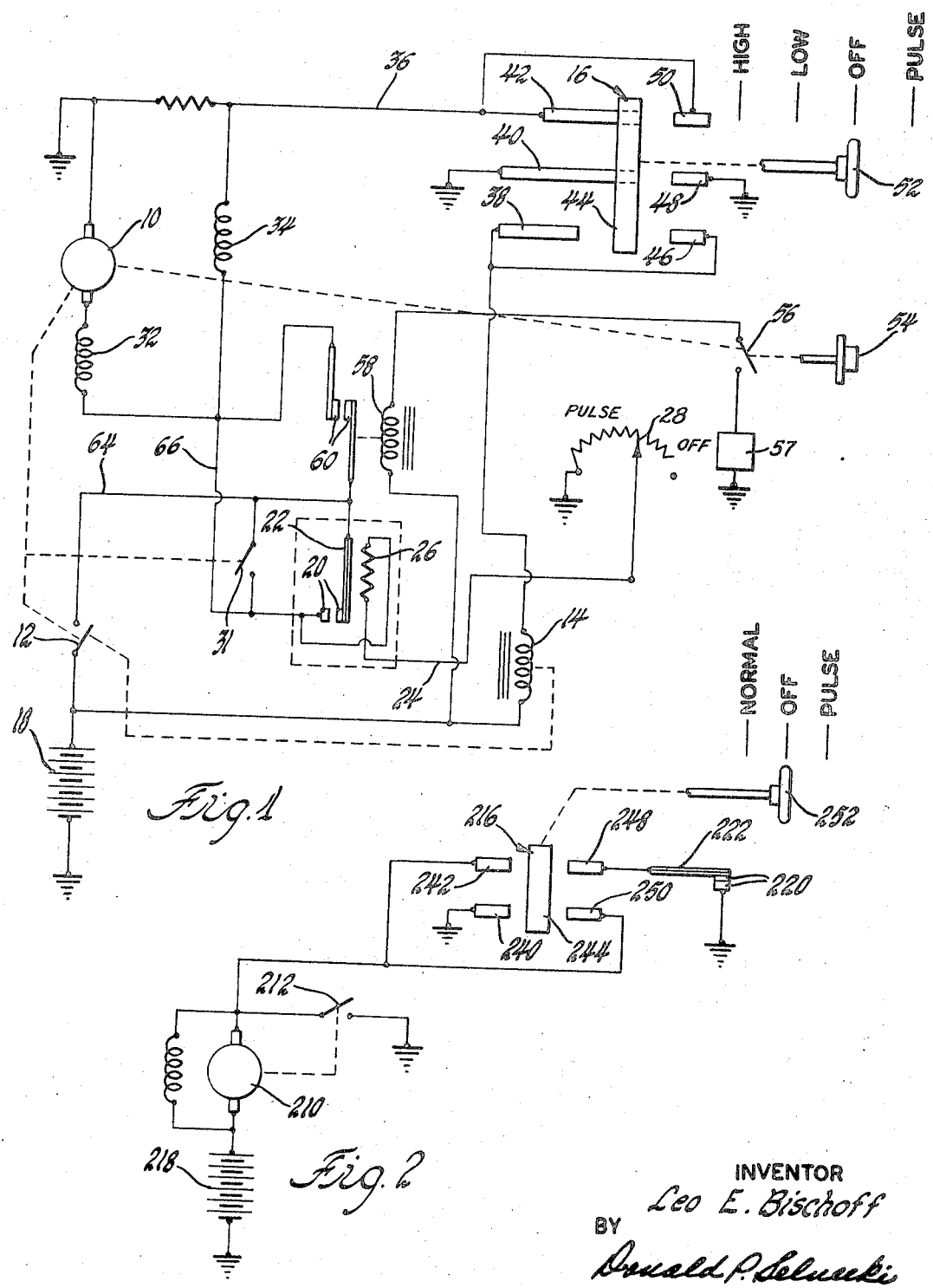

3,487,492
PULSE CONTROL WIPER
Leo E. Bischoff, Dayton, Ohio, assignor to General Motors Corporation, Detroit, Mich., a corporation of Delaware
Filed Nov. 25, 1966, Ser. No. 596,844
Int. Cl. A47l 1/04; B60s 1/08; H02p 1/04
U.S. Cl. 15—250.02
4 Claims

ABSTRACT OF THE DISCLOSURE

In a preferred form, this disclosure relates to a control system for controlling operation of a windshield wiper unit and a washer unit of an automotive vehicle. Specifically, the control system includes an electric motor for driving the windshield wiper unit, a washer unit for delivering washing fluid to the windshield, a power source, and a first control circuit means operatively connected with the wiper motor and the power source and operable to intermittently energize the electric motor to drive the wiper through a cycle of operation each time it is energized. The first control circuit means is defined as including a bimetallic thermal timer for controlling the time period between the intermittent energization of the wiper motor and a manually operable switch in series with the timer for selectively controlling energization and de-energization of the first control circuit means. The control system further includes a second control circuit means operatively connected with the washer unit and wiper motor for energizing the washer unit and for continuously energizing the wiper motor. The second control circuit means is in parallel with the timer so that during the time the washer unit is energized the wiper motor is continuously energized and so that when the washer unit is de-energized the wiper motor is again intermittently energized.

---

This invention relates to windshield wiper-washer control means and more particularly to a control circuit for electrical windshield wipers which transforms an electric windshield wiper selectively into a two-speed conventional windshield wiper or pulse wiper.

Windshield wipers of variable speed are desirable for use on motor vehicles in that changing climatic conditions make cleaning a windshield accomplished more efficiently utilizing different speeds of the wiper blade. A pulse-type windshield wiper which involves a blade moving at a constant speed across a windshield but with a frequency of wipe altered for a given condition also offers certain advantages. Electric windshield wipers have found wide acceptance on vehicles because of the ease with which the speed of wipe is changed for changing conditions but such electric wipers are not normally adaptable for use as pulse wipers. Consequently, pulse wipers are, more often than not, fluid driven devices incorporating the disadvantages of a fluid drive system.

In addition to the foregoing, a combination pulse wiper and conventional variable speed wiper is not available for use on vehicles because of the heretofore present cost and design limitations of combining the two types of systems.

It is an object of the present invention to provide a simple and economical to manufacture combination variable speed and pulsing electric windshield wiper-washer system for use on motor vehicles.

It is another object of the present invention to provide a windshield wiper-washer system as described in the previous object but with the added feature of automatically reverting to continuous operation when washer apparatus is energized.

It is still another object of the present invention to provide an improved control circuit for an electrically driven windshield wiper which gives it both a variable speed and a pulsing capability for utilizing conventional electric drive motors.

It is a further object of the present invention to provide an improved control circuit for electrically operated windshield wipers which is wiper load responsive to automatically control the pulsing frequency.

It is a yet a further object of the present invention to provide an improved control circuit for electric windshield wipers which is selectively current responsive to change a pulsing frequency but which is automatically overridden to revert to a constant velocity and frequency of sweep during operation of the windshield washer.

Further objects and advantages of the present invention will be apparent from the following description, reference being had to the accompanying drawings wherein preferred embodiments of the present invention are clearly shown.

In the drawings:

FIGURE 1 is a diagrammatic illustration of one embodiment of the subject invention which is current responsive;

FIGURE 2 is a diagrammatic illustration of another embodiment of the present invention which is load responsive.

Referring to FIGURE 1, an electric motor 10 drives a windshield wiper across the windshield in a conventional manner. Switch 12 is cam operated by motor 10 to be automatically opened after one cycle of operation of the wipers and is selectively closed by coil 14 upon movement of manual switch 16 to an ON position. Battery 18 provides power for operation of motor 10.

A normally closed switch 20 is represented by a set of contacts, one of which is carried by a bimetallic element 22. Current through lead 24 energizes heater 26 when switch 16 is in any operative position, resulting in a separation of contacts 20 breaking the electric circuit from battery 18 to motor 10 if rheostat 28 is turned on. The rheastat 28 therefore is manually operable and functions as an ON-OFF switch as well as variably controlling the input into heater 26 and thereby determines the amount of deflection of bimetallic element 22. When motor 10 goes through one cycle of windshield wiping operation, its associated cam member (not shown) driven by motor 10 synchronous with the wipers moves switch 31 to its open position, as shown in FIGURE 1, to shut off current flow to heater 26 initiating a cooling thereof.

Motor windings 32 and 34 control the speed of motor 10 and, when lead 36 is connected to ground, results in winding 34 being in the motor circuit bringing about low speed operation of motor 10. This situation occurs when bus bars 38, 40 and 42 are bridged by slidable conductor 44. Bus bars 46, 48 and 50 are the same electrically as bars 38, 40 and 42, respectively, thereby causing low speed operation of motor 10 whenever the conductor bar 44 engages either set of the three bus bars. When only bus bars 38 and 40 are contacted, winding 34 is shunted from the motor circuit resulting in high speed operation of motor 10. With actuator handle 52, carried by conductor bar 44, engaging bus bars 46, 48 and 50, the pulse wiping mode is selected with the motor operating in low speed. It is clear that actuator 52 is pulled to bring about a pulse mode of operation and is pushed from the off position shown in the drawings to a low or high speed bus bar conducting arrangement to bring about continuous low speed or high speed motor operation.

Actuator button 54 directly engages switch 56, which when closed, brings about operation of a washer unit 57 connected in series therewith. The closing of switch 56 energizes coil 58 closing the normally open contacts 60.

Contacts 60 are electrically in parallel with contacts 20 and effectively short circuit bimetallic element 22 when contacts 60 are closed.

The normal cycle of operation is initiated by moving conductor bar 44 to a position where bus bars 38, 40 and 42 are bridged. Coil 14 is energized closing switch 12. Battery power is then provided through lead 64 to bimetallic element 22, through closed contacts 20, through lead 66 to motor 10 with both coils 32 and 34 being in the circuit. Low speed motor operation is thereby selected. During this mode of operation, rheostat 28 would be off and switch 56 for the washer also would be off. Therefore, wiper motor 10 would oscillate at low speed with switch 12 being held closed by coil 14 at the end of each sweep pattern to continue the cycling of motor 10.

Essentially, this is the same type of operation as previously described when conductor bar 44 bridges bus bars 38 and 40 with the exception that bus bar 42 is not engaged by bar 44 resulting in the shunting of motor winding 34 from the motor circuit bringing about high speed motor operation. In this mode of operation, the subject switch 12 is held closed after every sweep pattern is completed, resulting in continuous wiper operation at high speed.

When actuator 52 is pulled, drawing conductor bar 44 into bridging relationship with respect to bus bars 46, 48 and 50, a low speed wiper operation is selected in the pulse mode. Low speed wiper operation of a continuous nature will continue while in the pulse mode until rheostat 28 is moved from the OFF position into a position bringing heater 26 into the circuit. The amount of opening of rheostat 28 will determine the amount of heating of heater 26 with a corresponding amount of deflection of bimetallic element 22. As soon as bimetallic element 22 deflects, the separation of contacts 20 is brought about opening the circuit through contacts 20 to motor 10. This will occur before motor 10 has driven the wiper blades through one cycle so cam operated switch 31 provides a short around now open contacts 20 to continue motor operation until switch 31 is cammed open at the end of the cycle.

Depending on the amount of deflection of bimetallic element 22 and, consequently, the amount of cooling thereof necessary to remake contacts 20, motor 10 will remain inoperative. When the cooled bimetallic strip 22 remakes contacts 20, motor 10 will again start through one more cycle of operation and, of course, close switch 31. It should be understood that motor 10 is in the low speed mode and the pulsing of bimetallic element 22 does not change the speed of the motor but merely controls the delay between cycles of operation thereof. In this manner, true pulse wiping is generated.

The subject control is provided with an override in the form of button 54 which, when depressed, energizes coil 58 to close the normally open contacts 60 providing continuous motor operation therethrough shunting around the bimetallic element operated contacts 20. When a predetermined number of washing cycles have taken place, switch 56 is cammed open by motor 10, resulting in the deenergization of coil 58 and the opening of contacts 60. Motor 10 thereby reverts to the mode of operation previously selected and continues until actuator 52 is moved to another mode.

Referring to FIGURE 2, another embodiment of the subject invention is illustrated which is responsive to the load generated in motor 210 for operation. The switch, generally designated by the numeral 216, includes a conductor bar 244 with normal bus bars 240 and 242 as well as pulse bus bars 248 and 250. Bimetallic element 222 carries one of two contacts 220 and another remains fixed. Battery 218 provides power to motor 210 and includes cam means for operation of cam operated switch 212.

For normal operation of the embodiment shown in FIGURE 2, actuator 252 connected with conductor bar 244 is moved so that bus bars 240 and 242 are bridged. The circuit is thereby established between the battery and ground through motor 210, resulting in single speed continuous operation of said motor. The operation of motor 210 continues until conductor bar 244 is moved out of bridging engagement with bus bars 240 and 242. Motor 210 continues to operate through cam operated switch 212 until a cycle is completed and switch 212 opens.

When the pulse mode is selected, conductor bar 244 is moved into bridging engagement with bus bars 248 and 250. Power is thereby provided through normally closed contacts 220 from battery 218, resulting in the energization of motor 210. If the amount of frictional resistance on the windshield is insufficient to load motor 210 and to heat bimetallic element 222, motor 210 will remain constantly engaged resulting in non-pulsing operation. This would normally be the situation when sufficient water is disposed on the windshield to lubricate the blade and thereby offer the blade very little resistance to wiping.

As the amount of lubricating liquid on the windshield diminishes, the need for frequent wiping action likewise diminishes and this increased resistance to wiping is translated into a load on the motor and the heating of bimetallic element 222 due to the increased current requirement. Bimetallic element 222 will deflect separating the contacts 220 but motor 210 will finish the cycle already started and will move to a parked position due to the continued energization of motor 210 through cam operated switch 212. When bimetallic element 222 cools, it deflects to reengage contacts 220 reenergizing motor 210. The amount of frictional resistance on the glass to wiper movement will determine the amount of heating of bimetal 222 and, therefore, the length of delay between wipes will be directly proportional to the amount of resistance. It is clear that, as more liquid finds its way onto the glass, the frictional resistance to wiping decreases and the wiping pulses become more frequent. In this manner, the frequency of the pulses is directly proportional to the need for wiping and the subject mechanism is automatically adjusting to the need for a wiping action by sensing the load from the motor 210.

The subject invention finds particular utility in the environment of a windshield wiping system on a vehicle. It is clear that the combination of a pulse wiping windshield wiper and a continuously operating windshield wiper provides a versatility for use that is unequalled by a pulse wiper or a continuous action wiper operating alone.

While the embodiments of the present invention, as herein disclosed, constitute preferred forms, it is to be understood that other forms might be adopted.

What is claimed is:

1. A control system for controlling operation of a windshield wiper unit and a washer unit of an automotive vehicle comprising: an electric motor for driving the windshield wiper unit when energized; a washer unit for delivering washing fluid to the windshield when energized; a power source; first control circuit means operatively connected with said electric motor and said power source and operable to intermittently energize said electric motor to drive the wiper through a cycle of operation each time it is energized, said first control circuit means including a timer means for controlling the time period between the intermittent energization of the wiper motor and a manually operable switch in series with the timer means for selectively controlling energization and deenergization of said first control circuit means; and second control circuit means operatively connected with said washer unit and wiper motor and in parallel with said timer means for energizing the washer unit and for continuously energizing the wiper motor during the duration of operation of said washer unit, said second control circuit means including a manually operable switch controlling energization and de-energization of said second control circuit means.

2. A control system for controlling operation of a windshield wiper unit and a washer unit of an automotive vehicle comprising: an electric motor for driving the windshield wiper unit when energized; a washer unit for delivering washing fluid to the windshield when energized; an electrical power source; first control circuit means operatively connected with said electric motor and said power source and operable to intermittently energize said electric motor to drive the wiper unit through a single cycle of operation each time it is energized, said first control circuit means including a bimetallic, thermal timer means for controlling the time period between the intermittent energizations of the wiper motor and a manually operable switch in series with the timer for selectively controlling energization and de-energization of the first control circuit means; and second control circuit means operatively connected with the washer unit and wiper motor and in parallel with said timer means for energizing the washer unit and for continuously energizing the wiper motor during the duration of operation of the washer unit, said second control circuit means including a manually operable switch for controlling energization and de-energization of the second control circuit means, said second control circuit means when de-energized after washer operation being ineffective to control energization of the wiper motor whereupon the timer means of said first control circuit means again effects intermittent energization of the wiper motor.

3. A control system as defined in claim 2 wherein said first control circuit means also includes a heater element disposed adjacent the bimetallic timer means and a rheostat connected in series with the heater element and the bimetallic thermal timer means and which is adjustable to control the heating of the bimetallic thermal timer means to control the time period between the intermittent energizations of the wiper motor, and wherein said first control circuit means also includes a switch in parallel with the bimetallic timer means and which is operatively connected with the wiper motor and moved to an open position when the wiper unit is in its parked position and to a closed position when the wiper unit is not in its parked position to provide a bypass circuit to keep the wiper motor energized until it has gone through a single cycle of operation.

4. A control system as defined in claim 2 wherein said bimetallic thermal timer means is in series with the wiper motor and is responsive to the load imposed on the wiper unit when wiping the windshield.

References Cited

UNITED STATES PATENTS

| | | | |
|---|---|---|---|
| 3,148,399 | 9/1964 | Ziegler | 15—250.02 |
| 3,351,836 | 11/1967 | Kearns | 318—466 XR |

FOREIGN PATENTS

| | | |
|---|---|---|
| 230,220 | 3/1925 | Great Britain. |
| 1,285,849 | 1/1962 | France. |

ORIS L. RADER, Primary Examiner

R. J. HICKEY, Assistant Examiner

U.S. Cl. X.R.

318—443